United States Patent [19]
Ueno et al.

[11] 3,919,680
[45] Nov. 11, 1975

[54] TEMPERATURE DETECTOR HEAD

[75] Inventors: Sadayasu Ueno; Yukio Hosho, both of Katsuta, Japan

[73] Assignee: Hitachi, Ltd., Japan

[22] Filed: June 25, 1974

[21] Appl. No.: 483,043

[30] Foreign Application Priority Data
Sept. 14, 1973   Japan.............................. 48-103010

[52] U.S. Cl. ...................... 338/28; 338/22; 338/25; 338/30; 338/229; 338/271
[51] Int. Cl.²............................................ H01C 7/00
[58] Field of Search ............ 338/28, 30, 22, 23, 25, 338/229, 271, 273, 276; 73/362 AR; 29/612

[56] References Cited
UNITED STATES PATENTS

| | | |
|---|---|---|
| 2,113,610 | 4/1938 | Bacon................................. 338/30 |
| 2,890,429 | 6/1959 | Baker................... 338/28 |
| 3,281,518 | 10/1966 | Stroud et al. ................. 338/28 UX |
| 3,356,980 | 12/1967 | Roberts.............................. 338/28 |

*Primary Examiner*—C. L. Albritton
*Attorney, Agent, or Firm*—Craig & Antonelli

[57] ABSTRACT

A structure of detector head for a high temperature measuring device utilizes a small disk of thermistor as the detecting element and is adapted to be directly mounted on to the wall of a high temperature body such as an engine cylinder block, the resultant advantages being quick response, simple structure, easy and versatile mounting and reliable operation.

4 Claims, 4 Drawing Figures

TEMPERATURE DETECTOR HEAD

BACKGROUND OF THE INVENTION

1. Field of the Invention

The present invention relates to a detector for detecting the surface temperature of a solid body, particularly, to a sensing head of the temperature detector which is particularly useful in a case where a quick response is required, for example, in the case of measurement of the temperature on the wall of an internal combustion engine.

2. Description of the Prior Art

Various kinds of detectors for detecting the surface temperature of solid body have been devised and placed in practical use. In particular, in the case where a quick response is required, a small thermo-couple has been used as the sensing element in direct contact with the body the temperature of which is to be measured. However, the electromotive force of a thermo-couple is generally very small, and a temperature measuring device using a thermo-couple cannot be accomplished without use of an ammeter having a high sensitivity, a d.c. amplifier or other instruments which are fragile and apt to be broken by such disturbances as impact or vibration, or which cannot be completed as a practical device without high manufacturing cost. These defects can be removed by use of a thermistor as the temperature sensing element. As a thermistor has a high sensitivity, a temperature detector using a thermistor has advantages of simple structure, ruggedness and low cost. However, it also has a defect arising from the fact that the response of the thermistor is generally slow compared with that of thermo-couple.

SUMMARY OF THE INVENTION

Accordingly, an object of the present invention is to put to practical use a temperature detector for detecting the temperature on the surface of a solid body with a quick response, by using a disk-type thermistor with a high productivity and low cost.

Another object of the present invention is to provide a structure of a sensing head of the temperature detector with which, when a temperature detecting element is mounted onto the surface of a solid body, a comparatively large dimensional tolerance is allowable in the distance between the mounting surface of the solid body and the spot where the temperature is to be measured.

The above and other objects, features and advantages of the invention will be apparent from the following description taken in conjunction with the accompanying drawings.

DESCRIPTION OF THE PREFERRED EMBODIMENTS

Figure 1:
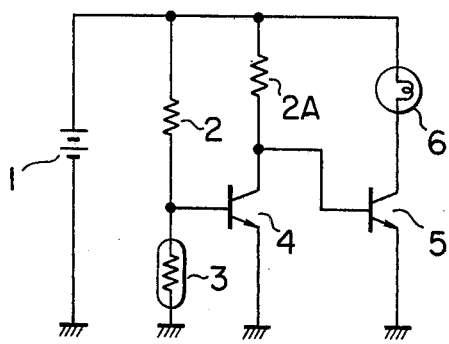
FIG. 1 is a schematic circuit diagram of a temperature detector of the prior art.

With reference to FIG. 1, there is shown a schematic circuit diagram of a known temperature detector. In the figure, denotations of the reference numerals are as follows; 1 denotes a battery, 2 and 2A fixed resistors, 3 a thermistor having a negative temperature characteristic to be used as a temperature sensing element, 4 and 5 transistors, and 6 an alarm lamp. It is assumed, here, that the heat sensing element 3 is buried, for example, in an engine block (not shown). When the temperature of the engine is ordinary, the resistance of the sensing element 3 is high enough to actuate the transistor 4 and consequently to keep the transistor 5 in an off state. On the other hand, when something causes the temperature of the engine to abnormally rise, due to whatever reason, the resistance of the thermistor decreases so that the voltage applied to the base of the transistor 4 decreases to make the transistor 4 non-conductive and thereby to turn the transistor 5 conductive. Thus the alarm lamp 5 is lighted.

A description will be made of an embodiment of a detector head of the temperature detector in accordaace with the present invention, which may be used with the same circuit as described above, with reference to FIGS. 2 and 3.

Figure 2:
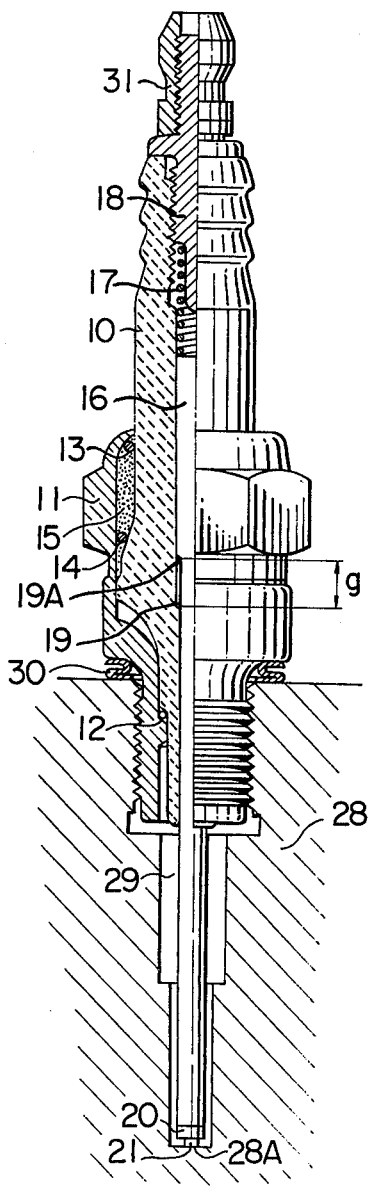
FIG. 2 is a partly sectioned view of an embodiment of a temperature detector head according to the present invention.
Figure 3:
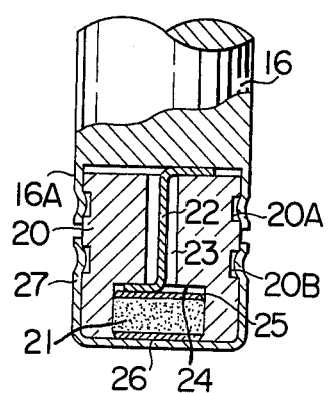
FIG. 3 is an enlarged sectional view of the essential portion of the detector head of FIG. 2.

As shown in FIG. 2, a tube-like insulator 10, formed of porcelain, is fitted into a plug member 11, a packing 12 being provided therebetween. Fastening rings 13 and 14 are put in place while the space defined by the walls of the insulator 10 and the plug member 11 is filled with powder such as talc, and then the upper peripheral opening of the plug member 11 is closed by caulking. A metal rod 16 is fitted in the center bore of the insulator, and at the top end thereof a spring 17 of stainless steel is placed against a stopper 18 which is secured to the insulator 10 by screw threads and cement. Although the spring 17 normally is biased so as to push the rod 16 downward, the rod and the bore of the insulator are formed with stepped portions as designated by the numerals 19A and 19, which are engageable to prevent the rod from coming off the insulator. As the result, the stepped portion 19A of the rod 16 pushes the counterpart of the insulator 10 with a slight force, thereby to eliminate idle space in the bore of the insulator. It should be noted that the spring 17 is positioned near the top end of the insulator 10, i.e., at the place as far as possible away from the plug member 11, in order to minimize fatigue of the spring caused by high temperature. It will be noted that the rod 16, the spring 17, the stopper 18, and a terminal cap 31 are all made of metal and provide a continuous path for electric conduction.

The lower end of the rod 16 protrudes out of the insulator 10, and is provided thereat with a disk-type thermistor 21 with a spacer 20 interposed therebetween. The spacer is formed of a heat-insulating material. The figuration of these components are illustrated in detail in FIG. 3. As seen in the figure, the end of the rod 16 is cut into a cavity. The rim 16A thereof is shaped and positioned so as to fit into a groove 20A of the spacer 20, and the spacer 20 is secured to the rod 16 by caulking the rim 16A. The spacer 20 has a through-hole 23 through which a metal lead 22 is drawn. The spacer also has a cavity 24 communicating with the hole 23, into which the thermistor 21 is fitted.

One end of the metal lead 22 is pressed against the end wall of the rod with the spacer, while the other end thereof is pressed against one electrode 25 of the thermistor with the bottom of the cavity of the spacer 20. The other electrode 26 of the thermistor is brought into close contact with the inner wall of the cap 27 by application of a pressure. The cap 27 is provided for shielding the thermistor from the atmospheric gas.

Thus constructed, the temperature detector head is screwed into a hole 29 of the body 28 whose temperature is to be measured, with a packing 30 placed therebetween, and fixed to the body so that the heat may be directly transferred from the bottom 28A of the hole 29 to the thermistor 21. It is to be noted that when the plug member 11 is screwed into the hole 29, the rod 16 moves relatively to the insulator 10 to widen the gap g between the stepped portions 19 and 19A and to further compress the spring 17. The packing 30 is usually made of a thin metal plate, but it may be made of rubber.

The temperature detector head described above has outstanding advantages. Firstly, a good thermal conduction to the thermistor 21 is ensured, since the cap 27 is effectively pressed by the spring 17 against the body whose temperature is to be measured. Secondly, the operation or response is quick and accurate since a thin metal with a high thermal resistance is used for the metal lead 22 while a heat-insulating material with low thermal conductivity is used for the spacer 20 to minimize the dissipation of heat. Thirdly, since the use of the spring 17 gives a relatively large dimensional tolerance in mounting of the temperature head, versatility in the mounting is enhanced. Fourthly, thermal stability is improved and thus a durable but reliable detector head is obtained, since the detector head is constructed in such a way that the spring 17 is located far away from the plug member, or located near the top end of the tube-like insulator 10 in order to minimize the fatigue of the spring 17 due to a high temperature. Finally, in the aspect of manufacturing process, since the major assembling processes are performed by caulking as familiar in the fabrication of ignition plugs, the manufacturing work is easy and may be automated so that a cost down of the products is possible and the producibility is expected to be high.

Figure 4:
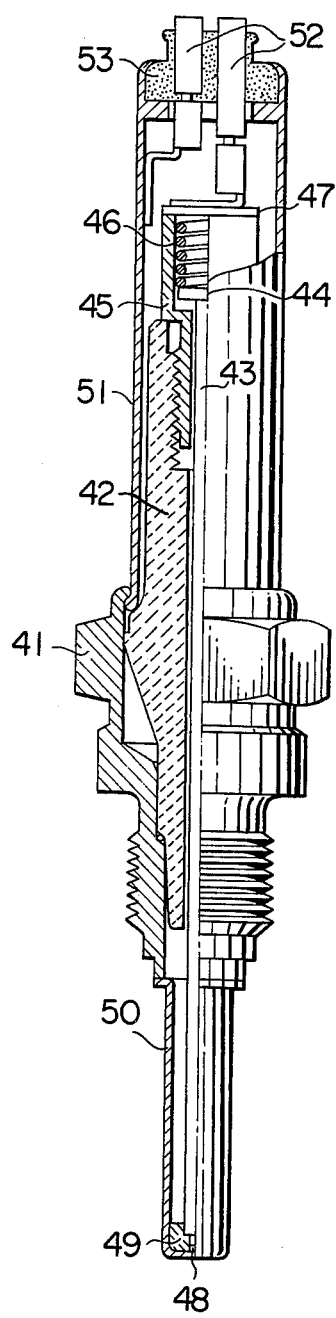
FIG. 4 is a partly sectioned view of another embodiment of a detector head according to the present invention.

Another embodiment of the present invention is illustrated in FIG. 4. A plug member 41 is substantially the same as the plug member 11 in the first embodiment. A tube-like insulator 42 is hermetically secured to the plug member 41 by caulking and the diameter of the bore of the insulator 42 is uniform without any stepped portion, but has a threaded portion near the end of the insulator. A rod 43 also has no stepped portion but is provided at the end with a stopping head 44. A cylindrical metal case 45 having a hollow stem whose outer wall is screw-threaded, is screwed into the tapped hole of the tube-like insulator, while the rod 43 penetrates through the hollow stem. A spring 46 is encased in the cylindrical case 45 whose upper end is closed by a cover 47 in order that the spring presses the stopping head 44 of the rod 43. The disk-type thermistor 48 provided at the lower end of the rod is supported by a guide member 49 and a sheath 50. The thermistor 48 is electrically connected at one side thereof to the rod while at the opposite side thereof to the sheath. Both the projecting portions of the cylindrical case 45 and the tube-like insulator 42 are covered by a protecting cover 51. Lead wires 52 are secured to the protecting cover 51 and drawn through a bushing 53. In this embodiment, when compared with the first embodiment, less effect of heat is given to the spring due to the fact that the spring is further away from the heat source and located in contact with a case of thermal conductor. Furthermore, an easy manufacturing is attained because the bores of the rod and the tube-like insulator have no stepped portions.

What is claimed is:

1. A temperature detector head comprising a hollow plug member having means for securing said plug member to a body for measuring the temperature of the body, a generally tube-like insulator hermetically fitted into said plug member, a metal rod slidably fitted into said tube-like insulator, one end of said metal rod protruding out of said insulator and said plug member, a spring provided against the other end of said metal rod so as to push said rod in the axial direction toward said one end, and a piece of thermistor provided on said one end of said metal rod, wherein said metal rod and the bore of said tube-like insulator are stepped in diameter so as to prevent said rod from coming off said insulator.

2. A temperature detector head comprising a hollow plug member having means for securing said plug member to a body for measuring the temperature of said body, a generally tube-like insulator hermetically fitted into said plug member, a metal rod slidably fitted into said tube-like insulator, one end of said metal rod protruding out of said insulator and said plug member, a spring provided against the other end of said metal rod so as to push said rod in the axial direction toward said one end, and a piece of thermistor provided on said one end of said metal rod, wherein said other end of said metal rod protrudes out of said tube-like insulator and into a cylindrical metal case attached to the end of said insulator and said spring is encased in said cylindrical case.

3. A temperature detector head according to claim 1, wherein there is included a spacer of insulating material which is attached at one end thereof to said one end of said metal rod and has a cavity at the opposite end thereof into which said piece of thermistor is fitted.

4. A temperature detector head according to claim 3, wherein said spacer has a bore by which said one end of said spacer communicates with said cavity so that a conductor for said thermistor is drawn therethrough, and said spacer is provided with a metal cap covering said cavity.

* * * * *